No. 731,844. PATENTED JUNE 23, 1903.
F. C. BILLINGS.
BED COVER HOLDER.
APPLICATION FILED AUG. 27, 1902.
NO MODEL.
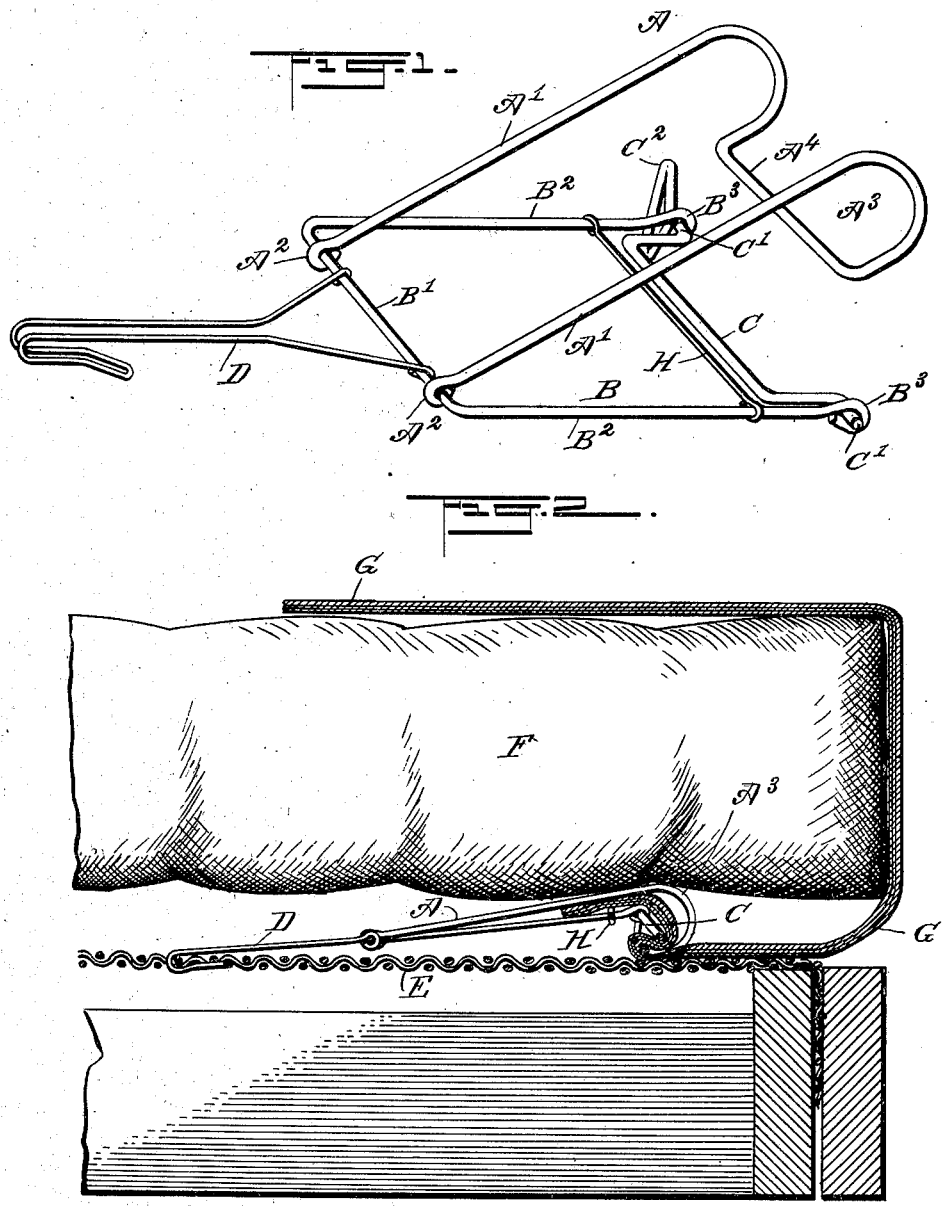
WITNESSES:
INVENTOR
Frederick C. Billings
BY
ATTORNEYS.

No. 731,844. Patented June 23, 1903.

UNITED STATES PATENT OFFICE.

FREDERICK C. BILLINGS, OF MACON, MISSOURI.

BED-COVER HOLDER.

SPECIFICATION forming part of Letters Patent No. 731,844, dated June 23, 1903.

Application filed August 27, 1902. Serial No. 121,201. (No model.)

*To all whom it may concern:*

Be it known that I, FREDERICK C. BILLINGS, a citizen of the United States, and a resident of Macon, in the county of Macon and State of Missouri, have invented a new and Improved Bed-Cover Holder, of which the following is a full, clear, and exact description.

The invention relates to clamping devices such as shown and described in Letters Patent of the United States No. 685,562, granted to me October 29, 1901.

The object of the invention is to provide a new and improved bed-cover holder which is simple and durable in construction, cheap to manufacture, easily applied, and more especially designed for holding the coverings securely in position and to allow convenient opening of the holder for removal of the coverings whenever it is desired to do so.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1 is a perspective view of the improvement, showing the members in an open unlocked position; and Fig. 2 is a longitudinal sectional elevation of the same as applied.

The improved bed-cover holder consists, essentially, of members A and B, a crank locking or clamping bar C, and a hook D for holding the device in position on a woven-wire or other bed-bottom E, over which extends a mattress F, so that the device is located between the bottom E and the mattress F, as indicated in Fig. 2.

The members A and B are hinged together and are preferably made approximately U shape, the member A having its side bars $A'$ formed with eyes $A^2$, engaging the middle bar $B'$ of the member B, the side arms $B^2$ of which are provided at their free ends with eyes $B^3$, forming journals for the trunnions $C'$ of the crank-bar C, adapted to clamp coverings G in position in a downwardly and inwardly extending hook $A^3$, formed by the outer portions of the side bars $A'$ and the middle portion $A^4$ of the member A.

A brace H connects the side bars $B^2$ of the member B with each other to prevent the said side bars from unduly spreading adjacent to the crank clamping-bar C. The latter can be readily turned in its bearings by a suitable handle $C^2$, formed or secured on one of the trunnions $C'$.

In order to use the device, the members A and B are held in an open position, with the crank clamping-bar C thrown rearward, as shown in Fig. 1, and then the operator introduces the covering G between the said members and then swings the member A toward the member B to cause the latter to lie close to the member A, after which the operator turns the handle $C^2$, so as to swing the crank clamping-bar $C'$ forward and downward to clamp the material of the covering G in the hook $A^3$ of the member A, as plainly indicated in Fig. 2. When the covering is thus locked to the device, the latter is pushed under the mattress over the bed-bottom until the covering is drawn tight, as desired, and then the hook D is hooked onto the bed-bottom E to hold the device and cover against movement.

When it is desired to release the covering G, the operator turns the handle $C^2$ in an opposite direction to swing the clamping-bar C back into its former position, and thereby unlock the material previously clamped in the hook $A^3$ by the said clamping-bar.

Any suitable number of devices, as shown and described, may be applied on the bed near both the sides and ends of the bottom E, it being understood that in either case, however, the device is not visible from the outside.

It is understood that by the arrangement described the covering is securely fastened in place, so as to prevent children, patients, and other persons from displacing the coverings while asleep.

Having thus described my invention, I claim as new and desire to secure by Letters Patent—

1. A bed-cover holder comprising two members hinged together, one of the members being provided at its free end with a hook and the other member carrying a turnable crank clamping-bar, adapted to swing in and out of the said hook, and a fastening device for the said members, to removably hold the same in position on the bed-bottom, as set forth.

2. A bed-cover holder comprising two members hinged together, one of the members having its free end terminating in a hook extending downwardly and inwardly toward the free end of the other member, the latter being provided with bearings at its free end, a crank clamping-bar having a handle and trunnions journaled in the said bearings of the second member, the said clamping-bar being adapted to swing in and out of the hook of the first-named member, as set forth.

In testimony whereof I have signed my name to this specification in the presence of two subscribing witnesses.

FREDERICK C. BILLINGS.

Witnesses:
   CHAS. E. THOMPSON,
   WALTER T. DUNAWAY.